United States Patent [19]

Steiner

[11] Patent Number: 4,477,858
[45] Date of Patent: Oct. 16, 1984

[54] SELFHEALING CONDENSER

[75] Inventor: Holger Steiner, Erndtebrück, Fed. Rep. of Germany

[73] Assignee: Steiner KG, Erndtebrück, Fed. Rep. of Germany

[21] Appl. No.: 472,109

[22] Filed: Mar. 4, 1983

[30] Foreign Application Priority Data

Mar. 6, 1982 [EP] European Pat. Off. ......... 82101789.4

[51] Int. Cl.³ .................. H01G 1/017; H01G 1/015
[52] U.S. Cl. .................................... 361/273; 361/304
[58] Field of Search ................ 361/273, 303–313, 361/301, 323, 324

[56] References Cited

U.S. PATENT DOCUMENTS

| 3,298,864 | 1/1967 | Maylandt | 361/273 |
| 3,419,770 | 12/1968 | Tomago et al. | 361/324 |
| 3,644,805 | 2/1972 | Heywang | 361/303 X |
| 4,142,222 | 2/1979 | Kotschy et al. | 361/273 |

FOREIGN PATENT DOCUMENTS

| 2359432 | 6/1975 | Fed. Rep. of Germany . |
| 2411813 | 9/1975 | Fed. Rep. of Germany . |
| 2641232 | 3/1978 | Fed. Rep. of Germany . |
| 2700013 | 7/1978 | Fed. Rep. of Germany . |
| 2703636 | 8/1978 | Fed. Rep. of Germany . |
| 2730038 | 1/1979 | Fed. Rep. of Germany . |
| 2826481 | 1/1980 | Fed. Rep. of Germany . |
| 2902195 | 7/1980 | Fed. Rep. of Germany . |
| 882179 | 11/1961 | United Kingdom . |

*Primary Examiner*—Donald A. Griffin
*Attorney, Agent, or Firm*—Karl F. Ross; Herbert Dubno

[57] ABSTRACT

A selfhealing condenser utilizes a vapor-deposited aluminum-zinc coating whose aluminum concentration decreases progressively over the thickness of the coating from the foil outwardly from at least 80% by weight aluminum to at most 20% by weight aluminum with the overall concentration being 5 to 40% by weight aluminum.

14 Claims, 6 Drawing Figures

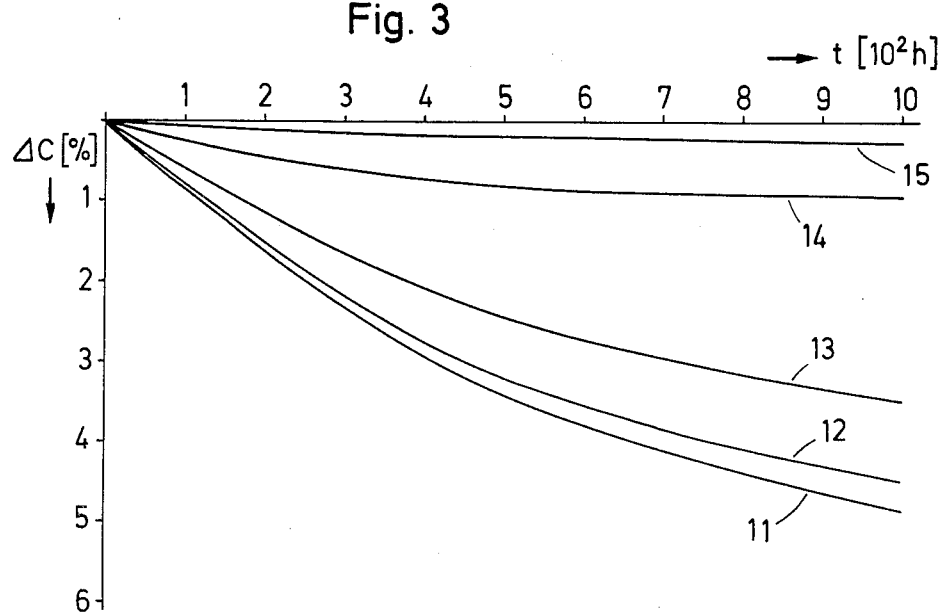
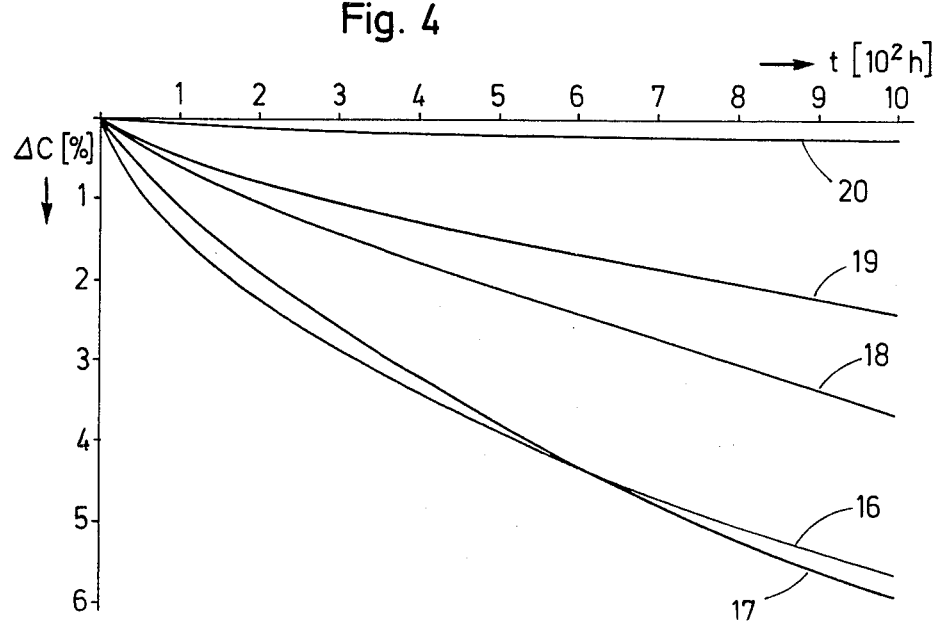

SELFHEALING CONDENSER

FIELD OF THE INVENTION

Our present invention relates to a selfhealing condenser and, more particularly, to a condenser for high current and alternating current applications which is capable of healing a bridge between electrodes across the dielectric material which might otherwise lead to failure of the condesner.

BACKGROUND OF THE INVENTION

Condensers for alternating current and high current applications are constituted of two dielectric foils, one of which is provided from a contact edge to shortly before the opposite edge with a metal layer which can be vapor deposited and can be composed of an alloy of aluminum and zinc. Such condensers are extremely compact and because of their small volume are widely used.

When the principal criterion is ease of deposition of the metalic layer, it is generally composed of zinc. When the principal criterion is low electrical resistance, the metal layer is usually composed of aluminum.

It has also been found that long term storage and long life points to the use of zinc-coated foils and that, after fabrication of the condenser, upon sealing failures or the application of high field strengths, changes in the metal layer can occur. For example, the highly conductive aluminum may be transformed into practically insulating aluminum oxide by oxidation, thereby reducing the electrode surface area and reducing the capacity of the condenser.

An increase in foil thickness tends to reduce the mean field strength correspondingly and to reduce the oxidation and hydroxylation of the metallic coatings. However, since the oxidation and hydroxylation processes are concentrated primarily along the edges and may be promoted by the presence of dust or like substances which increase the field strength in these regions, an increase in the thickness does little to overcome the problem of storage deterioration and the like. The reduction in field strength also reduces the selfhealing capability of burning away such bridges.

Consequently, attention has been directed to zinc as a perfect metal for such capacitors. While this metal has a higher corrosion reistance than aluminum, however, its reduced electrical conductivity requires it to be vapor deposited in greater thicknesses which facilitate selfhealing. A disadvantage is the fact that the corrosion products of zinc have substantially higher volume than the starting layer and the formation of corrosion products gives rise to mechanical deterioration of the capacitor.

Faced with these problems, a host of improvements have been proposed.

For example, it has been proposed to provide an initial layer of chromium, silver, titanium or alloys thereof upon which a second thicker layer of aluminum can be applied (German patent document Printed Application DE-AS 23 59 432). From German patent document Open Application DE-OS 24 11 813, it is known to provide a polyscrystalline insulating layer under an aluminum coating while German patent document Open Application DE-OS 26 41 232 describes the stabilization of conductive layers of aluminum, zinc and/or cadmium with metal compounds, for example, oxides. In German patent document Open Application DE-OS 27 00 013, a first comparatively thick layer of aluminum is coated with a second comparatively thin layer of copper, nickel, cobalt, titanium, tungsten or zinc. These approaches are all designed to improve the corrosion resistance of aluminum without inordinately increasing the thickness of the metal layers and thus to reduce the capacity loss of condensers.

German patent documents Open Application DE-OS 27 03 636, DE-OS 27 30 038 and DE-OS 29 02 195 describe electrode materials in which metal layers of alloys are provided, the alloys generally containing 15 to 18 atomic percent aluminum, and copper, zinc, manganese, tin, silver, chromium, iron and lead as other components. They also contemplate the use of aluminum alloys which can contain 0.5 to 10%, preferably 2 to 5% copper and even intermetallic compounds of aluminum, nickel, magnesium, titanium, hafnium, beryllium or bismuth. Even with these various aluminum containing products, however, it is not possible to solve completely the loss of capacity of condensers fabricated from vapor deposited metal foil or to insure constant capacity under loading.

OBJECTS OF THE INVENTION

It is the principal object of the present invention to provide a metal layer which can be vapor deposited on a condenser foil to form a condenser electrode, which as a high storage life and does not display corrosion phenomenon even over long periods of time so that use of the material in a condenser is possible with high loading and practically no capacity loss.

Another object of this invention is to provide an improved condenser or capacitor capable of operating under high loading with minimum loss.

Still another object of the invention is to provide a capacitor electrode system which obviates the disadvantages of earlier systems and, more specifically, is less sensitive to the corrosion phenomenon than earlier electrode systems.

SUMMARY OF THE INVENTION

I have now found that these objects can be attained when the electrode comprises a vapor deposited metal coating which is an alloy of aluminum and zinc in which aluminum is present in an amount of 5 to 40% by weight, and in which the aluminum concentration of the metal layer on the side turned toward the foil is at least 80% by weight and on the side turned away from the layer is less than 20% by weight, the aluminum concentration within the metal foil decreasing from the side of the layer turned toward the foil toward the side turned away from the foil.

Surprisingly, this construction of the metal coating practically eliminates corrosion phenomena, enables long term storage of the metallized foils without problems of the type which have hitherto plagued earlier approaches, and permits the fabrication of condensers operating with high loading and low capacity losses.

Since the layer is practically fully resistant to corrosion or at the very least has a significantly higher corrosion resistance than earlier metal coatings, the metal layers can be extremely thin so that the costs and material utilizations are minimized, the condenser is far more selfhealing than condensers of the prior art and the capacity per unit volume can be enhanced. The high capacity maintenance is not affected by failures of the capacitor shell or long storage of the metal coated foils.

Best results have been obtained with coatings in which the mean aluminum content of the zinc alloy was 8 to 30% by weight and preferably 10 to 25% by weight.

The foil can be coated on one side by the metal layer or on both sides with similar metal coatings and in the latter case can be used in conjunction with unmetallized foils.

To eliminate problems with the formation of contact zones, the fact that especially thin layers of the metal can be used in accordance with the present invention can be exploited, such that the thickness of the metal layer can be reduced at the side opposite to the contact edge to $\frac{1}{2}$ to 1/6 of the thickness of the remainder of the metal coating which extends over 50% of the foil width.

The foils which can be used in accordance with the invention can be any upon which aluminum and zinc coatings have been formed in the production of such capacitors heretofore, including polypropylene, polyester, paper or like dielectric foils.

BRIEF DESCRIPTION OF THE DRAWING

The above and objects, features and advantages of the present invention will become more readily apparent from the following description, reference being made to the accompanying drawing in which:

FIGS. 3 and 4 are diagrams showing capacity losses and illustrating the invention, the capacity change being represented along the ordinate, while time in hundreds of hours is plotted along the abscissa;

SPECIFIC DESCRIPTION

Figure 1:
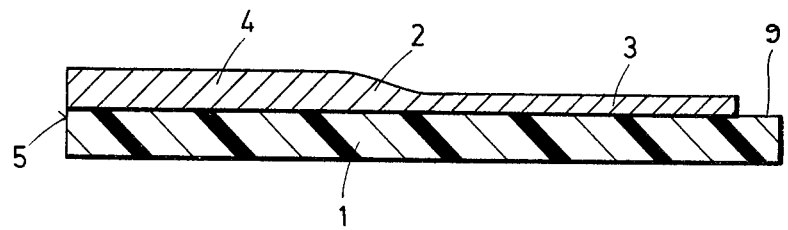
FIG. 1 is a cross sectional view through an electrode assembly for a capacitor according to the invention utilizing a one-sided metal-coated foil.

FIG. 1 is a cross section in which the thicknesses of the various parts have been greatly exaggerated by comparison to the width of a foil 1 of a dielectric synthetic resin material. Other dielectrics such as impregnated paper or paper which can be impregnated, or multilayer dielectrics, all known in the art of film, paper deposited metal and like capacitors can also be used.

The upper surface of the foil 1 is provided with the metallic layer whose right-hand end terminates short of the edge of the foil and whose opposite end runs flush with the contact edge 5. The increased thickness portion 4 extends only over 50% of the width of the foil and, in general will extend over such portion as will allow effective coiling in supply coils of acceptable diameter and simplify handling and coiling within the capacitor.

The metal coating 2 is applied by vapor deposition to the foil with the free edge 9 being masked. Before the metal is applied by vapor deposition, the surface of the foil to be treated can be prenucleated or otherwise treated to facilitate acceptance of the metal vapor deposited. This treatment could be effected by playing a corona discharge over the surface or by flash coating. As previously indicated, the metal coating 2 consists of an aluminum alloy in which the aluminum concentration is at least 80% by weight adjacent the foil surface and is reduced to less than 20% by weight along the surface of the coating turned away from the foil, the balance being zinc. The mean aluminum content of the aluminum-zinc alloy can be between 5 and 40 weight percent, more advantageously between 8 and 30 weight percent and most preferably between 10 and 25 weight percent.

Figure 6:
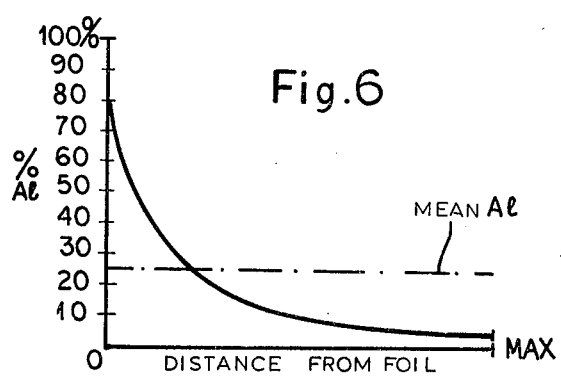
FIG. 6 is a graph illustrating the aluminum concentration in percent by weight within the vapor deposited coating plotted against the distance from the foil.

The proportions of aluminum and zinc are insured by controlling the relative concentrations of the two released into a vacuum chamber in which vapor deposition is effected, e.g. by opening or closing throttle passages, shutters or diaphragms between the aluminum and zinc source and the space in which the foil is provided. As shown in FIG. 6, from an aluminum concentration of slightly more than 80% by weight adjacent the foil, the aluminum concentration can be reduced progressively outwardly from the foil until it reaches a level slightly less than 10% at its outer surface so that the mean concentration of aluminum represented by the dot-dash line may lie at 25% by weight or less. The aluminum atomic proportion in the vapor deposition storage is correspondingly reduced as the coating builds up and the zinc concentration progressively increases.

The resulting metal layer 2 is found to have a remarkable corrosion resistance so that storage of the assembly is rendered practically noncritical allowing storage under ambient atmosphere without special antioxidation procedures or handling.

The foils are easy to handle and their fabrication is simplified since it is not necessary to engage in protective measures upon fabrication. The actual formation of the capacitors also is greatly simplified.

The capacitors which are wound from such foils show little change in shape even under repeated exposures to high field strengths as may be common in high current and alternating current condenser application and, indeed, practically no corrosion is detected and hence capacitance loss is minimized.

Figure 5:
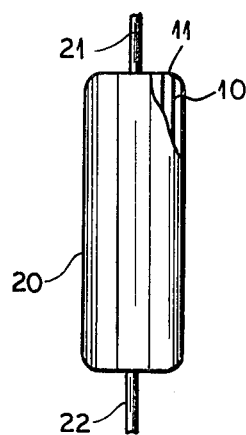
FIG. 5 is an elevational view of a capacitor partly broken away, utilizing the electrode assembly of FIG. 2, together with an uncoated foil.
Figure 2:
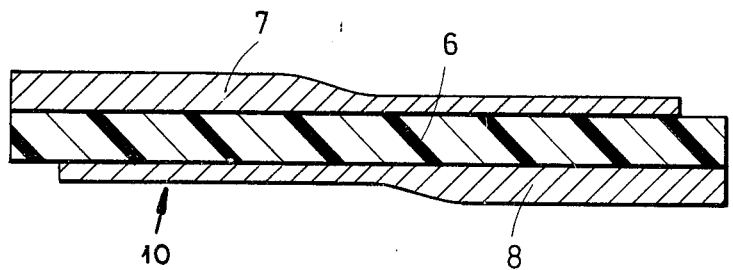
FIG. 2 is a similar section from a two-sided metal-coated foil.

A capacitor embodying the metal coated foils of the invention has been shown by way of example in FIG. 5 and comprises an insulating casing 20 in which the foil 10 of FIG. 2 is coiled together with an insulated foil 11 without metal coatings, the terminal wires 21 and 22 being applied to the metal coating by any conventional means.

Practical tests have shown that the condensers of the invention retain their capacitances over prolonged periods. For example, FIG. 3 shows the results of tests with polypropylene cup condensers using polypropylene dielectric foils. The curve 11 represents the capacitance loss for an electrode assembly in which a pure zinc layer was vapor deposited on a surface of the polypropylene foil which had previously been nucleated by a monoatomic layer of aluminum. After 1,000 hours, the capacitance loss was about 5%.

When the nucleation was effected with silver and the metal layer was pure zinc, the capacitance loss was represented by the curve 12 and corresponded to about 4.5% after 1,000 operating hours. Zinc-aluminum alloy coatings gave the result shown by the curve 13 which corresponded to a capacitance reduction of 3.5%. A sharply reduced capacitance loss was obtained utilizing a vapor-deposited aluminum layer coated with a thin zinc volume as represented by the curve 14 which showed a loss in excess of 1% over 1,000 operating hours. With the system of the invention, in which the aluminum concentration gradient in the alloy was established in accordance with FIG. 6, the capacitance loss could be reduced still further by a factor of about 4. Note that the mean aluminum concentration in the alloy corresponded to that of curve 13 and that in all of the cases provided, the thickness of the metal film was the same.

Indeed, I have found that the electrode system of the invention can be used for the production of open condensers, i.e. condensers which do not require sealing against the ambient atmosphere without significant danger of corrosion. In this case as well, tests showed a practically insignificant capacity loss. FIG. 4, for example, shows the capacity loss with open capacitors otherwise similar to those of the tests of FIG. 3. With the aluminum nucleated polypropylene foil provided with a pure zinc layer, (curve 16) the capacity loss was in excess of 5.6% while the silver nucleate system utilizing a pure zinc layer (curve 17) gave a capacity loss of approximately 6%. The zinc-aluminum alloy (curve 18) provided somewhat better results since the capacity loss was only 3.7% after 1,000 operating hours while the capacity loss was 2.4% (curve 19) for the aluminum layer coated with zinc. The curve 20 corresponding to the present invention aluminum gradient according to FIG. 6 even in an open capacitor construction showed practically no increase in capacity loss with a loss in capacitance after 1,000 hours of only about 0.25%.

In the tests represented in FIGS. 3 and 4, the same operating conditions were maintained.

Obviously with the system of the present invention open capacitors which can be fabricated at substantially lower cost can be utilized. It is a well known fact that ambient conditions are detrimental to most other commercially fabricated vapor-deposited metal capacitors.

The high corrosion resistance, moreover, permits especially thin metal layers to be used and therefore improves the selfhealing characteristics of the capacitor because it permits burning out of bridges between the thin metal layers with comparatively less energy and hence reduces generation of by-products liberated by the burning out of short-circuiting bridges.

The thinness of the metal coatings which can be used, permits thicknesses of two to six times the normal thickness to be utilized where enhanced thicknesses are required, e.g. at contact edges, without increasing the overall thickness prohibitively. Naturally, because the metal coatings of the invention can be thinner than those of earlier capacitors, even the provision of somewhat thicker portions is not detrimental to the overall selfhealing advantages previously discussed.

Finally, it may be mentioned that the metal films can be provided on both sides, i.e. foil doubly coated with the metal layers may be provided as shown in FIG. 2. In this case, metal layers 7 and 8 are provided on opposite sides of the dielectric foil 6 in the manner previously described and the resulting electrode assembly is wound together with a nonmetal-coated metal foil. Each of the metal coatings may thus have the aluminum concentration gradient in the aluminum-zinc alloy illustrated in FIG. 6.

I claim:

1. In a selfhealing condenser, especially for alternating current and high current application comprising at least two dielectric foils at least one of which is provided with a vapor-deposited coating of a metal, said coating terminating short of one edge of the coated foil and running to an opposite edge of the coated foil, the improvement wherein said coating consists of an aluminum-zinc alloy, the aluminum concentration in said alloy is at least 80% by weight at the side of said coating adjacent the coated foil and is at most 20% by weight at the surface of said coating remote from the coated foil, the aluminum concentration in said coating being substantially 5 to 40% by weight.

2. The improvement defined in claim 1 wherein the aluminum concentration in said coating is 8 to 30% by weight.

3. The improvement defined in claim 2 wherein the aluminum concentration in said coating is substantially 10 to 25% by weight.

4. The improvement defined in claim 1 wherein th aluminum concentration in said coating decreases progressively from adjacent the coated foil to said surface remote from the coated foil.

5. The improvement defined in claim 1 wherein said coated foil is coated on only one side with a metal coating.

6. The improvement defined in claim 1 wherein said coated foil is coated on both sides with respective metal coatings, each composed of said alloy.

7. The improvement defined in claim 1 wherein the thickness of said metal coating at said other edge of said coated foil is two to six times greater than the thickness of said coating at the portion of said coating terminating short of said one edge of the coated foil.

8. The improvement defined in claim 7 wherein the thicker portion of said coating extends over substantially 50% of the width of the coated foil.

9. An electrode assembly for a capacitor comprising a dielectric foil having a vapor-deposited coating of an aluminum alloy, said coating beginning inwardly of one edge of said foil and terminating at an opposite edge thereof and being of a thickness two to six times greater at the terminating edge than at the beginning edge, said coating consisting of 5 to 40% by weight aluminum and having aluminum concentration adjacent said foil of at least 80% by weight, an aluminum concentration along a side of the coating remote from the foil of at most 20% by weight, and decreasing from said foil to said side progressively.

10. The assembly defined in claim 9 wherein said coating consists of 8 to 30% by weight aluminum.

11. The assembly defined in claim 10 which consists of 10 to 25% by weight aluminum.

12. The assembly defined in claim 11 wherein the thicker portion of said coating extends over substantially 50% of the width of the foil.

13. The assembly defined in claim 12 wherein said coating is provided only on one side of said foil.

14. The assembly defined in claim 12 wherein such a coating is provided on each side of said foil.

* * * * *